US012386963B2

(12) United States Patent
Maia et al.

(10) Patent No.: US 12,386,963 B2
(45) Date of Patent: Aug. 12, 2025

(54) CONTINUOUSLY PROPAGATING KNOWLEDGE TO DECIPHER UNKNOWN MALWARE IN ZERO-TRUST ARCHITECTURES

(71) Applicant: Dell Products L.P., Round Rock, TX (US)

(72) Inventors: Isabella Costa Maia, São Paulo (BR); Karen Stéfany Martins, Belo Horizonte (BR); Pablo Nascimento da Silva, Niterói (BR); Werner Spolidoro Freund, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 295 days.

(21) Appl. No.: 18/183,384

(22) Filed: Mar. 14, 2023

(65) Prior Publication Data
US 2024/0311480 A1 Sep. 19, 2024

(51) Int. Cl.
*G06F 21/56* (2013.01)
*G06F 12/14* (2006.01)

(52) U.S. Cl.
CPC ............ *G06F 21/566* (2013.01); *G06F 12/14* (2013.01); *G06F 2212/1052* (2013.01); *G06F 2221/034* (2013.01)

(58) Field of Classification Search
CPC .................... G06F 21/566; G06F 2221/034
See application file for complete search history.

(56) References Cited

U.S. PATENT DOCUMENTS

| 9,349,103 | B2 * | 5/2016 | Eberhardt, III | ........ G06N 20/00 |
| 2021/0182387 | A1 * | 6/2021 | Zhu | .......................... G06N 7/01 |
| 2024/0012161 | A1 * | 1/2024 | Julien | ...................... G01S 19/20 |

(Continued)

FOREIGN PATENT DOCUMENTS

| CN | 105913849 B | * | 10/2019 | ............. G10L 17/02 |
| CN | 115296855 A | * | 11/2022 | ............ G06F 21/554 |
| CN | 116743430 A | * | 9/2023 | ............... H04L 9/40 |

OTHER PUBLICATIONS

Kirichenko, Polina, et al. "Task-agnostic continual learning with hybrid probabilistic models." arXiv preprint arXiv:2106.12772 (2021).

(Continued)

*Primary Examiner* — Christopher A Revak
(74) *Attorney, Agent, or Firm* — Workman Nydegger

(57) ABSTRACT

One example method includes deploying a malware detection model in a production environment, performing a monitoring process that comprises capturing data from the production environment, by the malware detection model, determining, by the malware detection model, that a likelihood that the data belongs to a domain known to the malware detection model falls below a threshold, determining, by the malware detection model, whether or not the data is noise, or comes from a new domain not known to the malware detection model, and when it is determined that the data comes from the new domain, adapting the malware detection model by incorporating knowledge about the new domain in the malware detection model so that the malware detection model is operable to detect malware in the new domain, as well as the known domain.

18 Claims, 6 Drawing Sheets

(56) References Cited

U.S. PATENT DOCUMENTS

2024/0119120 A1* 4/2024 Zhang ................... G06F 18/217
2024/0119121 A1* 4/2024 Lin ....................... G06F 18/217

OTHER PUBLICATIONS

S. Rose, "Planning for a Zero Trust Architecture: A Planning Guide for Federal Administrators," in NIST, 2022.
M. De Lange, R. Aljundi, M. Masana, S. Parisot, X. Jia, A. Leonardis, G. Slabaugh and T. Tuytelaars, "A continual learning survey: Defying forgetting in classification tasks," IEEE transactions on pattern analysis and machine intelligence, vol. 7, No. 44, pp. 3366-3385, 2021.

\* cited by examiner

CONTINUOUSLY PROPAGATING KNOWLEDGE TO DECIPHER UNKNOWN MALWARE IN ZERO-TRUST ARCHITECTURES

FIELD OF THE INVENTION

Embodiments of the present invention generally relate to identification of malware. More particularly, at least some embodiments of the invention relate to systems, hardware, software, computer-readable media, and methods, for use of continual learning to identify new and existing malware in a zero-trust environment.

BACKGROUND

The presence of malware in computing components and systems is a significant problem. A variety of efforts have been made to detect, and deal with, malware. However, typical approaches are not able to adapt to evolutions in the structure and operation of malware. As a result, while an entity such as a business enterprise may be able to protect itself, to some extent, against known malware, it may be difficult, or impossible, for conventional approaches to protect against evolving malware threats and actors.

More specifically, having a model capable of predicting data with a new distribution not seen in the training phase, such as a new threat, is a challenge for current detection models. Especially in a cybersecurity environment where threats are always evolving, and new ones need to be identified quickly and accurately. Besides, most models need annotated data to learn efficiently, which is also a challenge. Specialists usually spend a lot of time analyzing and annotating a substantial amount of data, making it difficult to keep an updated and efficient model, which makes the environment more prone to attacks. In addition, current solutions generally create a new model using old and new threats, which increases the processing and storage cost.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
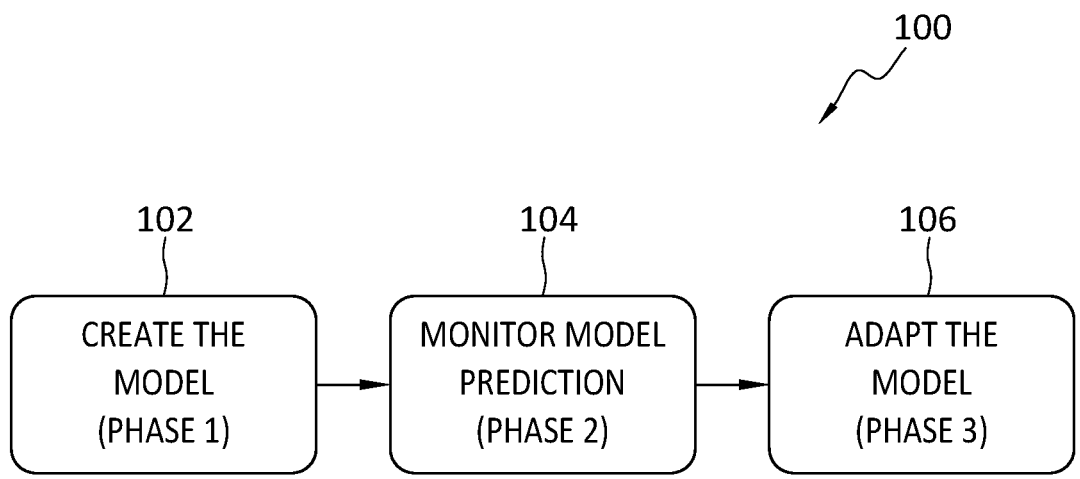
FIG. 1 discloses aspects of an overview, according to one embodiment, of the adaptation strategy phases to automatically detect new threats in a zero-trust environment.

Embodiments of the present invention generally relate to identification of malware. More particularly, at least some embodiments of the invention relate to systems, hardware, software, computer-readable media, and methods, for use of continual learning to identify new and existing malware in a zero-trust environment.

One example embodiment of the invention comprises a framework that may automatically detect a change in the data and adapt the model to predict new threats without losing the ability to detect older ones. An embodiment may initially start with a model, that is, a malware detection model, that can predict if a system presents malicious behavior. For predicting new data, that is, identifying whether or not new data presents a malware concern, an embodiment may analyze the data with low likelihood, indicating a possible new domain, that is, a domain that comprises data that does not fit within an known or identified malware domains. An embodiment may apply, to the new data, a Gaussian mixture model (GMM) with 'k' mixtures as the number of classes to group similar data and understand its distribution. Next, an embodiment may select samples from each mixture to get the real label from an oracle. The samples of the oracles may then be used to propagate labels to the other instances. Finally, an embodiment may adapt the model using both annotated and propagated data, without having to create a new model to deal with the new data.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s).

Finally, it is not required that any embodiment implement any of the advantageous and unexpected effects disclosed herein.

In particular, one advantageous aspect of an embodiment of the invention is that data, possibly indicating a new type of malware, may be identified by a model that has not been trained on that data. As another example, an embodiment may, through continual learning for example, be able to retain the capability to detect prior malware threats, while also automatically adapting to detection of new malware threats with which the model is unfamiliar. Finally, an embodiment may reduce, or eliminate, the need to create a new detection model for each new malware that is developed. Various other advantages of one or more embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer implemented.

A. Context for An Embodiment of the Invention

Continual learning is a machine learning research area specialized in building models that can re-use and retain knowledge from different tasks and data distributions. In other words, such technology can build a single model to perform many different tasks while using the dataset for each task only once. Therefore, it reduces the storage requirements of both models and data together with computational power requirements for training.

Continual learning may focus on learning new tasks without forgetting previous ones, therefore retaining knowledge and avoiding catastrophic forgetting. Thus, a continual learning model may be able to expand itself or increase learning capacity, allowing the reuse of knowledge between related tasks for better generalization. And, at the same time, the model may avoid performance degradation of previous tasks, while improving performance in new ones.

This approach may be useful in ever-changing environments such as zero-trust architectures. Zero-trust is a security architecture based on the 'never trust, always verify' paradigm. That is, a zero-trust (ZT) system should be capable of verifying all files, users, and activities happening inside a network and its participating devices. Thus, an embodiment of the invention may comprise the building, use, and modification, of one or more machine learning models for threat detection and response system for operation within a dynamic control plane of a ZT security architecture.

While continual learning methods exist, they typically consider that a label is present in the data to update the model, which is not the case in real-world scenarios such as malware detection. Thus, an embodiment of the invention may, in addition to identifying a new domain, also apply a labeling approach to label the data and be capable of retraining the model, reducing effort involved in the labeling task.

In more detail, with respect first to ZT architectures and processes, Zero trust (ZT) may comprise a set of principles upon which information technology architectures are planned, deployed, and operated. Zero trust uses a holistic view that considers potential risks to a given mission or business process and how they are mitigated. In a Zero-trust scenario, trust is never granted and, therefore, the activities in the network are always verified. Thus, every file, access and operation, must be authorized individually. The threat component is an important part in this architecture. Leveraging on data analytics built upon huge amounts of data, the systems should be able to identify threats, provide possible warnings and update the access policy for the user automatically. Thus, an embodiment of the invention comprises a solution for threat detection within the dynamic control plane of Zero-Trust security architectures.

With reference to further details continual learning, it may also be referred to as lifelong learning, sequential learning, or incremental learning. Continual learning is a growing machine learning paradigm that aims to learn new tasks continuously and adaptively by adding knowledge to the model without sacrificing the previously acquired knowledge. Unlike traditional architectures that focus on solving a single task at a time, continual learning may enable the training of a single model to perform many tasks using less computational power and model storage. It deals with the stability-plasticity dilemma, which focuses on accumulating knowledge, or plasticity, without catastrophically forgetting prior knowledge, that is, providing stability.

A single model capable of performing multiple tasks may take advantage of learned concepts such as forward and backward transfer. The knowledge earlier acquired may be used in the new tasks, and the new task examples may improve upon already learned tasks, which may help to avoid restarting the training process from zero, and may lead to improved generalization.

Continual learning may be divided into three scenarios, specifically, domain-incremental learning, task-incremental learning, and class-incremental learning. In the first one, tasks have the same classes, but input distributions are different. In task-incremental learning, the model is informed about which task needs to be performed, enabling creation of models with task-specific components. Differently, in class-incremental learning, models must be able to both solve each task seen so far, and infer which task they are presented with. All three scenarios assume that task boundaries are known during training, which can be a disadvantage when task identity is not available. Task agnostic continual learning focuses on this difficult scenario where the task boundaries are unknown during training of the model.

Thus, an embodiment of the invention comprises domain agnostic continual learning, where data arrives sequentially and can contain a new type of threat never seen before by the model. During training of the model, there may only be access to current threat data. The model may be built and/or refined to detect the new threat automatically, and the model may be automatically adapted to the new threat, so as to help predictive accuracy both with respect to known threats, and new threats.

B. Aspects of Some Example Embodiments

A model according to one or more of the disclosed embodiments may be employed in any environment where there is a need to be able to detect malware. Thus, an embodiment may be employed, for example, in an enterprise communications network which may be located on-premises and/or at one or more cloud locations. Further, an embodiment may be hosted on a server located at a local site, or a cloud site. Any of these operating environments may comprise, consist of, or be a part of, a zero-trust architecture. The foregoing are provided only by way of illustration and are not intended to limit the scope of the invention in any way.

B.1 Introduction

An embodiment of the invention may comprise a continual learning model adaptation strategy to automatically detect new threats, of which malware is an example, in a Zero-Trust environment. In one embodiment, the method may proceed as set forth hereafter.

Phase 1—Create the Model
1. Start with N datasets from the same task with different domains: e.g., T1 which contains safe files and malware of type A and B, and T2 for more safe files and malware type C
2. Train a continual learning model capable of modeling the distribution of each dataset and each class as a latent Gaussian distribution, transforming the data into a new space Z, and avoiding catastrophic forgetting. One example of a model that may be adapted for use in connection with an embodiment of the invention is a Hybrid Continual Learning (HCL) model as disclosed in Kirichenko, Polina, et al. "*Task-agnostic continual learning with hybrid probabilistic models.*" arXiv preprint arXiv:2106.12772 (2021) ('Polina'), which is incorporated herein in its entirety by this reference.

Phase 2—Monitor the Model
This phase may comprise deployment of the model that has been created, into a production environment, for example, an environment in which ongoing operations of a business entity are occurring, and in which malware threats are possible and expected. By way of contrast, one or more of the Phase 1 operations may be performed offline, that is, in an environment that is not a production environment. In an embodiment, monitoring of the model in the production environment may comprise capturing data every time the model predicts a file with likelihood lower than a threshold, which can indicate a new domain (m).

Phase 3—Adapt the Model (on the Fly in a Production Environment)
1. After collecting new data points with low likelihood, group the data points that are close to each other in a latent space Z according to a distance metric and a threshold. Then select groups with at least w data points, m≥w, where M is a set of data points in a specific group with m samples.
2. For each group, apply a Gaussian mixture model (GMM) with k mixtures where k=#Y (number of classes). This may involve removing data points with low likelihood as predicted by the GMM and, if the result is less than w data points, discard the data, assuming that it is noise, and then return to Phase 2.
3. Select a set of data points H with h samples from each of k mixtures. In an embodiment, the number of samples h should be much lower than the total number of selected data in the data group (i.e., h<<#m). In an embodiment, the selection may minimize the distance from all other samples in the same mixtures-that is, an embodiment may seek to select data points that deviate from the mixture distribution, avoiding propagating wrong labels to outliers. In an embodiment, these data may be selected by applying a Monte Carlo method.
4. Pass the h samples to an oracle to get the real label $y_o$
5. Use the samples (hard labels) of the oracles to propagate labels to non-labeled instances, that is, non-labeled data (in the example of FIG. 8, examples of data instances with the hard labels are indicated as HL, and examples of data instances that are unlabeled, or non-labeled, as NL)—in particular, create a normal distribution for each sample, and then aggregate the likelihood of each data point in M\H to define soft labels, where M is the set of all data points from the new domain and H is the set of all sampled data points.
6. Retrain the model using both hard and soft labels.
7. Return to Phase 2

An embodiment of the invention, such as the example just described, may possess various useful features and aspects. For example, an embodiment may comprise an approach to identify new threats and adapt a threat detection model automatically to detect and identify those new threats. Particularly, in a cybersecurity environment, new threats are created frequently, which makes it necessary to keep updating the model to detect those new threats. Thus, an embodiment may identify when new threats are emerging, and adapt a model to recognize them, without the model forgetting how to detect the old ones, through a continual learning approach employed by the model.

As another example, an embodiment may implement a label propagation approach to mitigate annotation effort. In particular, most machine learning models are supervised, which means that they need an annotated dataset to be trained. Data annotation is one of the most expensive tasks in building machine learning models. Typically, data annotations are difficult to acquire, and demand a significant amount of human effort. To mitigate that, an embodiment of the invention comprises a method to propagate labels on similar data, while preserving the existing expert knowledge of the model.

B.2 Detailed Discussion

An embodiment of the invention comprises a continual learning method for malware prediction in a zero-trust environment. The method may identify when the data is changing, and possible malwares or threats are being used against the system.

With reference now to FIG. 1, there are disclosed various phases that may be employed in a method 100 according to one example embodiment. Particularly, the example method may comprise three phases. In the first phase 102 ('Phase 1' in FIG. 1), an embodiment of which is discussed in further detail in connection with FIG. 2, a model may be created to detect malware.

Figure 3:
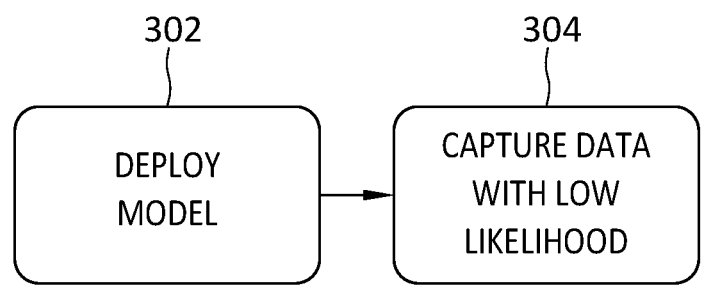
FIG. 3 discloses aspects of an overview of phase 2—monitor model predictions.

In the second phase 104 ('Phase 2' in FIG. 1), while the model is running in a production environment, an embodiment may analyze the model predictions and start capturing data with low likelihood, that is, data where the model confidence is low that the data relates to a known malware. An embodiment of this second phase 104 is discussed below in connection with FIG. 3.

In the third phase 106 ('Phase 3' in FIG. 1), an embodiment may perform an analysis to determine if the low confidence data comes from a new domain and, if so, may adapt the model to recognize that data. That is, an embodiment may incorporate the new knowledge in the model on-the-fly, without retraining the model from scratch, as discussed below in connection with FIG. 3.

B.2.1 Phase 1—Building the Initial Model to Predict Malware

Figure 2:
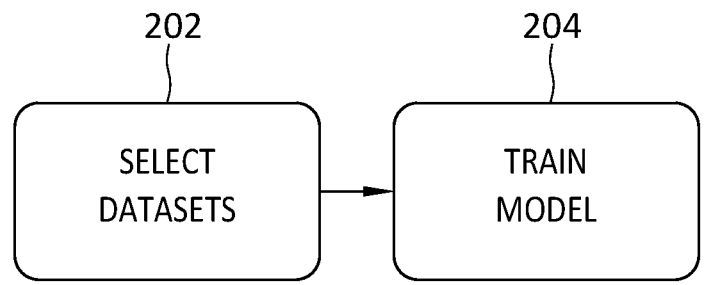
FIG. 2 discloses aspects of an overview of phase 1—initial model building.
Figure 5:
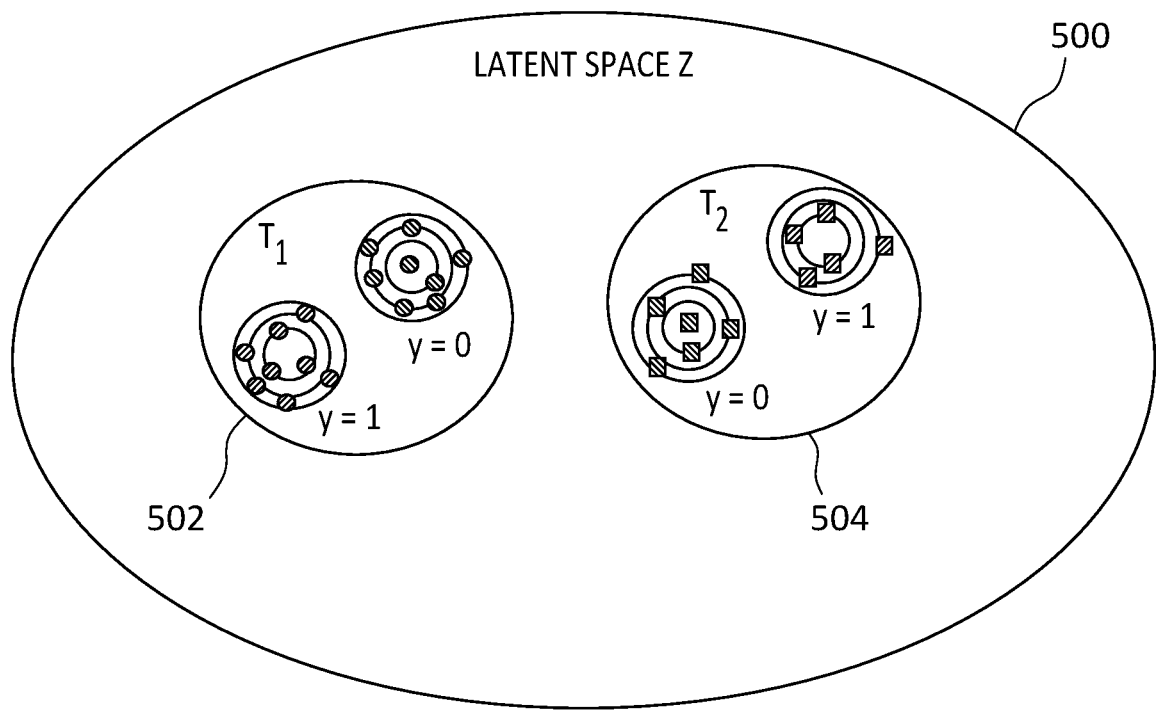
FIG. 5 discloses an example latent space Z after training two different tasks, T1 and T2, with respective Gaussian mixtures.

With attention now to FIGS. 2 and 5, details are provided concerning an example first phase of an embodiment of the invention. In general, the first phase 102 may be configured to build the initial malware detection model. The initial model may be configured and operable to predict malware, that is, to identify various malware based on an analysis of data provided to, or accessed by, the model. Thus, during the initial training of the model, an embodiment may collect 202 a dataset T1, which may also be referred to herein as a task T1, comprising a large collection of safe files, as well as files marked as malware type A and B. Note that in the example latent space Z 500 in FIG. 5, the dataset T1 is denoted at 502. Further, the malware types A and B are examples of classes of data, as that term is used herein. In an embodiment, more datasets may be added, such as the dataset T2 504 that may comprise more safe files, as well as files marked as malware type C. Note that in this example discussion, the file classes may be binary, that is, a file may be classed as either malware, or not malware. However, embodiments of the invention are not limited to binary classes, and may extend, more broadly, to classes with any number of types greater than 2.

To train 204 this initial model, an embodiment may build a union dataset Du={T1, T2, . . . , Tn}. Then, an embodiment may train the initial model using Du along with a continual learning strategy capable of transforming the data into a new latent space Z where the distribution of each dataset, and each class, may be modeled as a latent Gaussian distribution, so as to avoid catastrophic forgetting of knowledge previously gained by the malware detection model which may, in its initial form at least, be implemented as an HCL model. FIG. 5 presents this new latent space Z 500 for datasets T1 502 and T2 504, where y=0 represents non-malwares, and y=1 represents malwares.

Figure 6:
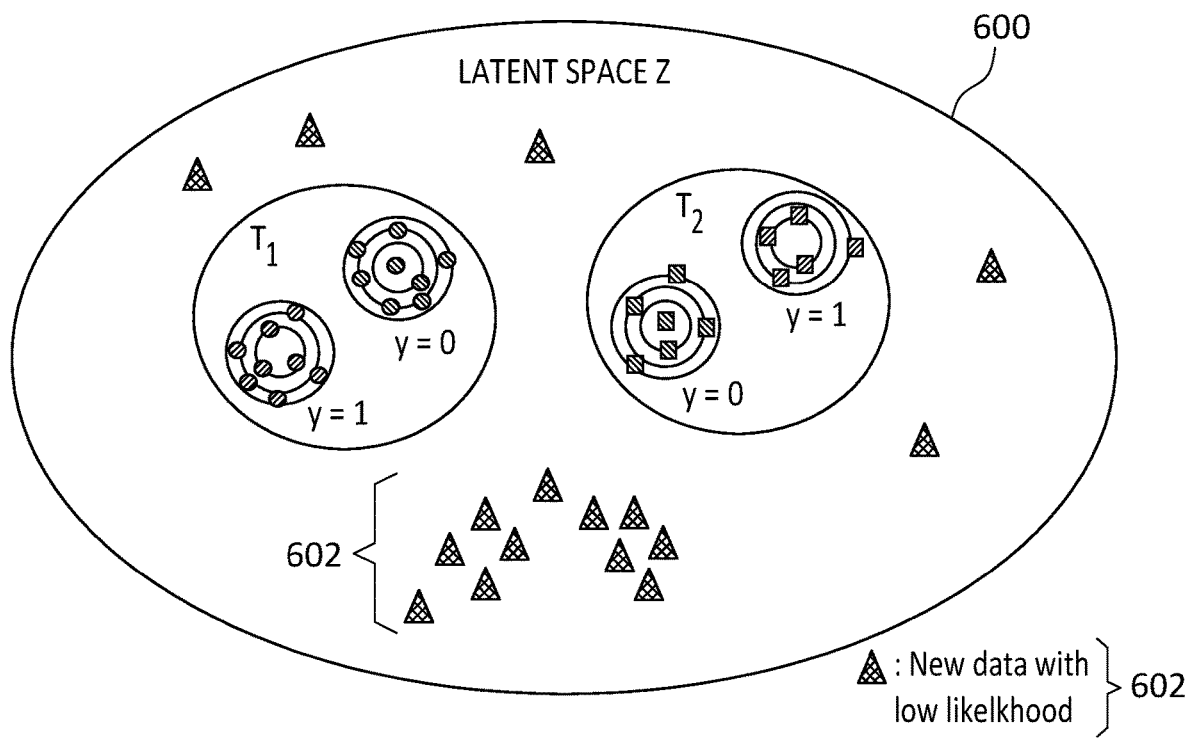
FIG. 6 discloses an example latent space Z after predicting new data with low likelihood.

B.2.2 Phase 2—Continually Monitoring the Model Prediction to Trigger the Identification of New Malware After training the initial model, an embodiment may deploy 302 the trained initial model in production. An embodiment may then start monitoring the model predictions generated by the model. Each time the deployed model predicts a data point with likelihood lower than a threshold, that is, there is a low likelihood that the data point belongs to any class known to the model, an embodiment may collect 304 from the file as well as its logs and metadata, where such metadata may comprised file information such usage of the file, size of the file, users of the file, and policies applicable to the file. Put another way, for data points that the model is confident about, that is, there is a high likelihood that the data points belong to a known class, those data points may not need to be evaluated, while the data points with low likelihood may indicate a new domain, that is, a new class that may comprise malware. FIG. 6 presents an example latent space Z 600 that comprises low likelihood data 602.

B.2.3 Phase 3—Analyzing New Domain and Adapting the Model

Figure 4:
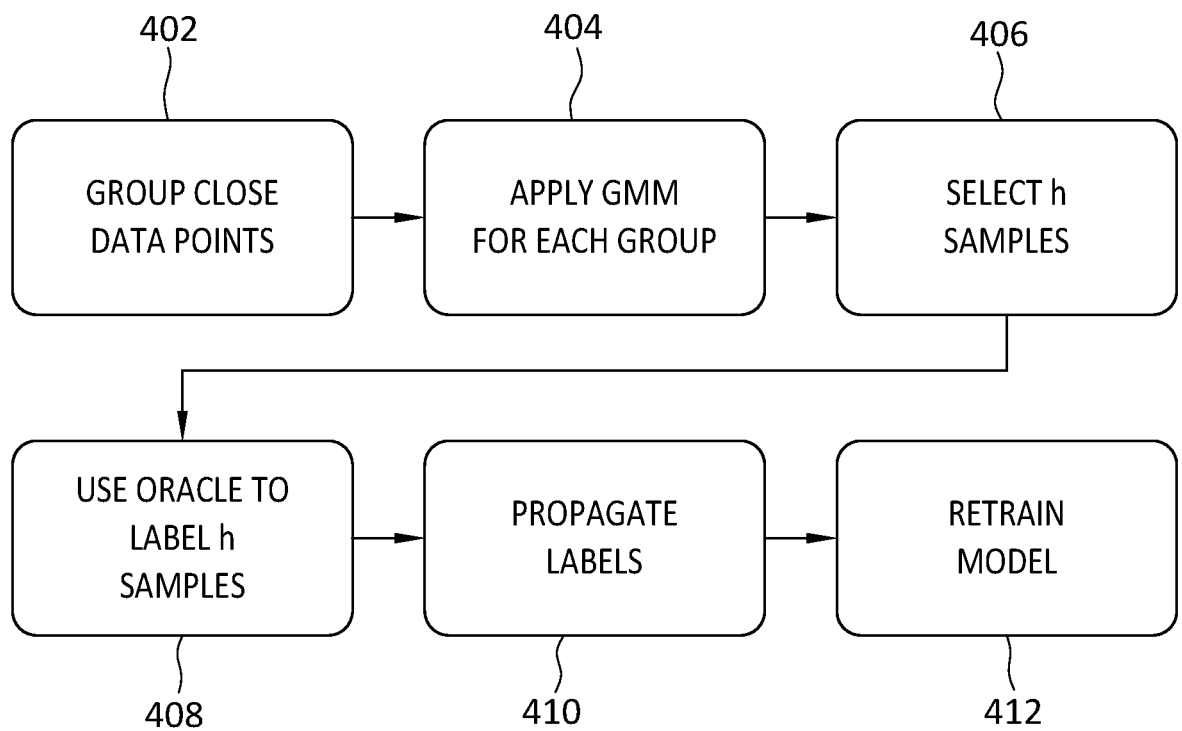
FIG. 4 discloses aspects of overview of phase 3—adapt model by label propagation.

After collecting 304 new data points with low likelihood, and with reference now to FIG. 4, an embodiment may then group 402 the data points that are close to each other in a latent Z space. Thus, an embodiment may define and implement a distance metric, such as Euclidean distance and a threshold for example, which may be used to indicate how close the grouped data points should be, to each other and/or to some specified data point(s), in order that they will be included in the same group together.

Figure 7:
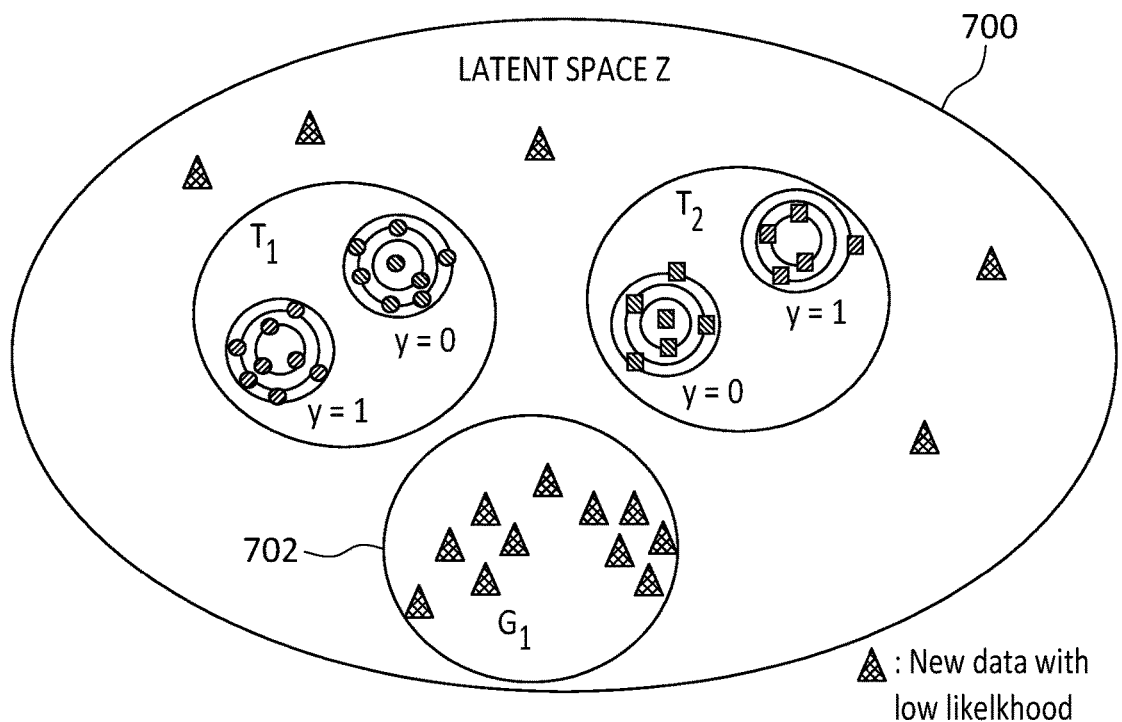
FIG. 7 discloses a new group G1 that contains data points that are close to each other in latent space Z, considering a distance metric and a threshold.

Then, the data may be passed to a Z space using the initial model, that is, an embodiment may use the model to convert the data to a new space, such as the Z space. To create the groups G of the low likelihood data, such as in the case of the latent space Z 700 that includes group $G_1$ 702 in FIG. 7, for each data point, an embodiment may calculate the distance from a low likelihood data point to the other low likelihood data points using the distance metric, and then group the low likelihood points whose distance is less than the defined threshold. Finally, an embodiment may select groups with at least w data points, m≥w, where M is a set of data points in a specific group with m samples. If a group does not have at least w data points, the data points in the group may be classified simply as noise that does not have a material bearing with respect to the possible definition of a new domain. FIG. 7 presents a new group $G_1$ 702 containing data points that are close to each other in space Z, that is, whose distances are equal to, or less than, the specified distance threshold.

After grouping the close data points 402 for each group G, as described above, an embodiment may apply, also to each group, a Gaussian mixture model (GMM) 404 (see FIG. 4) with k mixtures where k= #Y, which is the number of classes. In one embodiment, only two classes are considered, namely, the two classes #Y=2, non-malwares (y=0) and malwares (y=1). To handle outliers in the data points, an embodiment may define a minimum likelihood, and then remove data points that were predicted by the GMM with a respective likelihood lower than the minimum. That is, application of the GMM may divide a group G into data points that are outliers, and data points that are not outliers. This is shown in FIG. 8, discussed below.

After removing the outlier data points, if the size of the group G is less than w data points, an embodiment may discard the data, assuming it is noise, and return to Phase 2. On the other hand, if the number of data points is equal to, or greater than, w, an embodiment may select a set of data points H with h samples 406 from each k mixture, which, in an embodiment, should be much lower than the total number of selected data, that is, h<<#m.

Instead of applying a random selection of data points, an embodiment may optimize the grouping process by making a selection that should minimize the distance from all other samples in the same mixtures. For instance, an embodiment may apply a Monte Carlo approach. In other words, an embodiment may seek to select data points that deviate from the mixture distribution, so as to avoid propagating the incorrect labels to the outliers.

Figure 8:
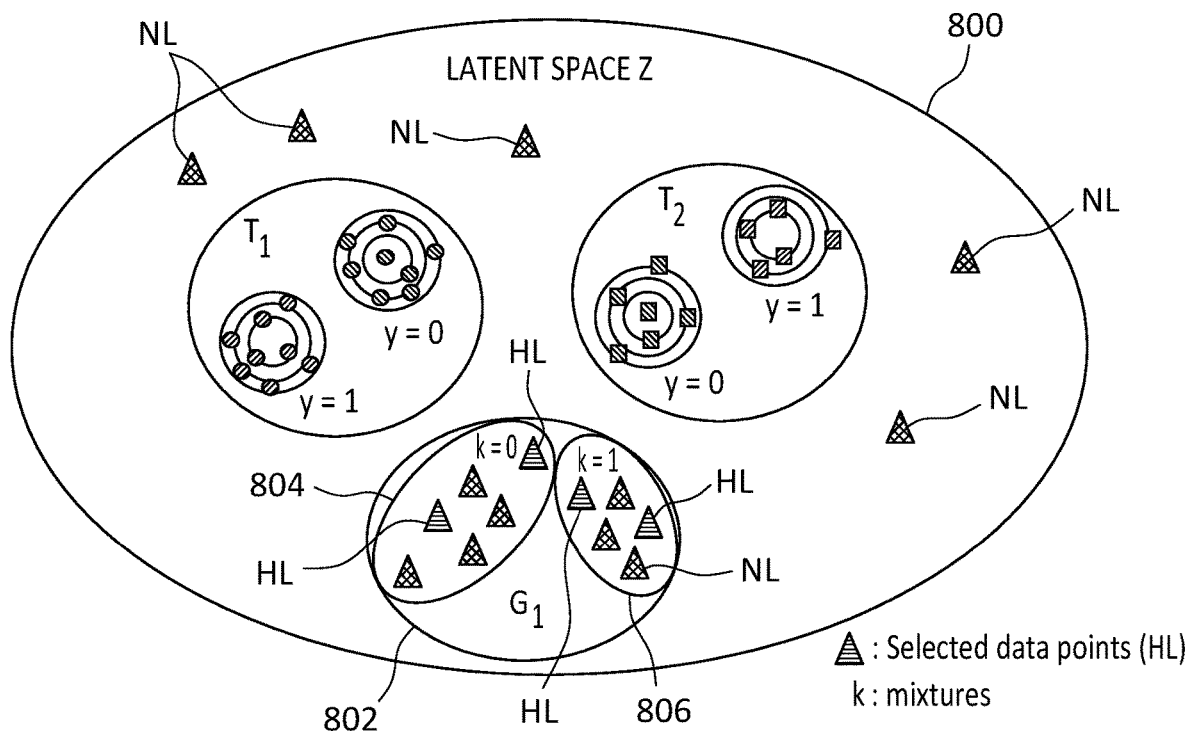
FIG. 8 discloses an example latent space Z after applying a Gaussian mixture model (GMM) with k mixtures and select h samples, where k=2 and h=2.

FIG. 8 presents a latent space Z 800 after application of a GMM with k mixtures and selection of h samples 406. In this example, k=2, and h=2. In more detail, the example group $G_1$ comprises two mixtures, that is, k=2, namely, the mixture k=0 804 and the mixture k=1 806. In each mixture, examples of selected low likelihood data points are denoted 'HL,' which, as noted earlier, indicates that there is a requisite degree of confidence that those low likelihood data points have been correctly labeled as being low likelihood. The example data points denoted 'NL' in FIG. 8 are data points that have not yet been labeled.

After the data samples have been selected 406, and as discussed above, an embodiment may then obtain the true, or correct, labels to label the data points in the 'h' samples 408. That is, an embodiment may get the true labels to be employed in the model training stage. Instead of using an oracle to label all the data points, an embodiment may select only the 'h' samples to retrieve the label $y_0$ (hard labels), and then propagate 410 those labels to non-labeled instances (soft labels), examples of which are denoted 'NL' in FIG. 8. Note that, in the example of FIG. 8, 'M' is the total set of all the data points, in group $G_1$ 802 and 'h' refers to the number of samples taken from 'H', which are denoted as 'selected data points'.

In order to obtain and propagate the labels, an embodiment may create a normal distribution for each labeled data point. With continued reference to the example of FIG. 8, these data points may be labeled as follows. A sample 'h' may be selected of unlabeled data points 'NL' and the sample sent to an oracle to be labeled. After these data points have been labeled by the oracle, and thus been re-designated as 'HL' as in FIG. 8, their labels may be propagated, if appropriate, to the unlabeled data points NL in the group $G_1$ 802.

Figure 9:
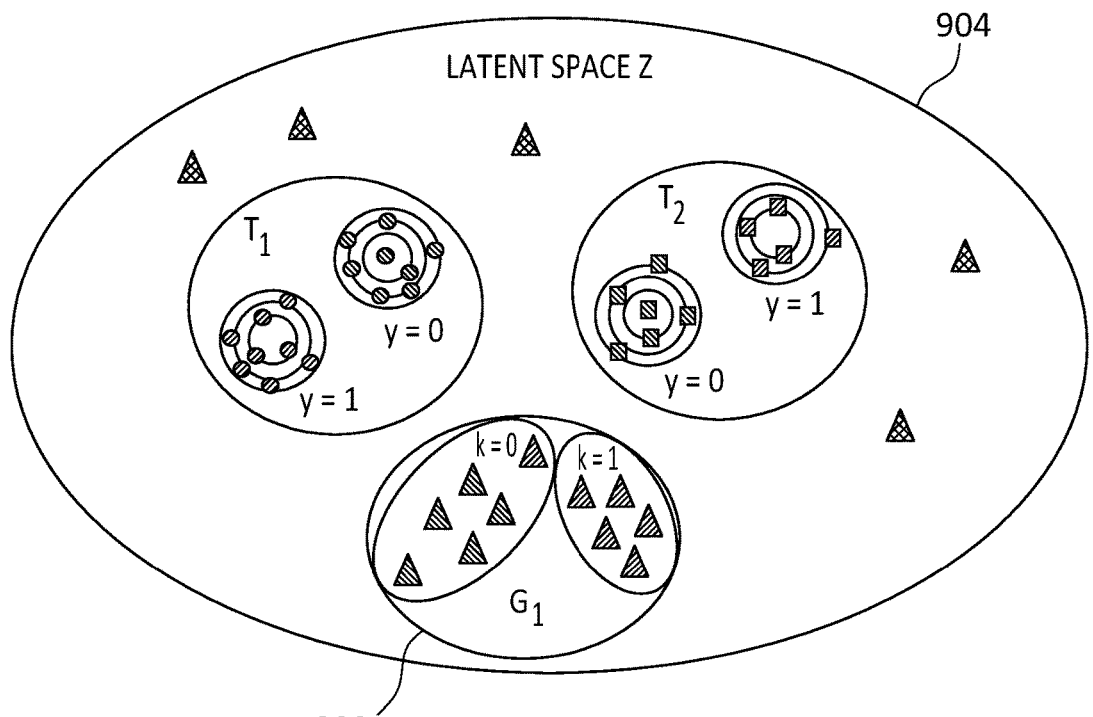
FIG. 9 discloses an example latent space Z after labeling all data points in $G_1$.

Then, for each data point in M\H (non-labeled by the oracle), an embodiment may aggregate the likelihood to define soft labels. In other words, an embodiment may calculate the similarity between a non-labeled instance 'NL' with all labeled instances 'HL' and select the most similar labeled instances as the soft label for the non-labeled instance. In the end of this process, all data points will be labeled with either a hard label, or a soft label. FIG. 9 discloses a possible configuration of a group $G_1$ 902 of a latent space Z 904 after all data points in the group $G_1$ 902 have been labeled.

Figure 10:
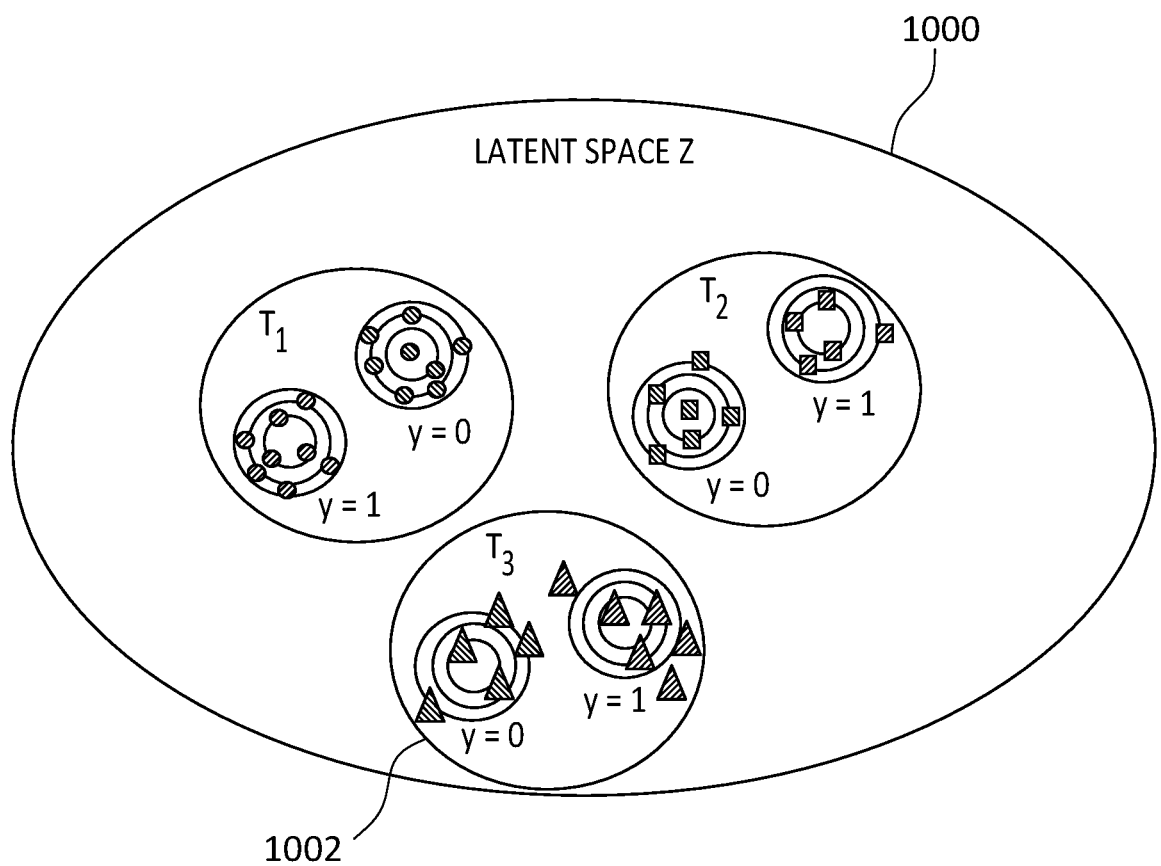
FIG. 10 discloses latent space Z after adapting a model to recognize the new domain $T_3$.

Next, an embodiment may create a new dataset Tn+1 containing all data points in the group $G_1$ 902 with its hard and soft labels. In addition, an embodiment may adapt 412 the initial model created in Phase 1, which may be an HCL model, with Tn+1 to recognize the new domain, without forgetting the other domains already known to the model. An example of an adaptation process that may be employed in an embodiment is disclosed in Polina. Finally, an embodiment may then return to Phase 2 (see FIGS. 1 and 3) to keep monitoring the model prediction to trigger the identification of any new malware. FIG. 10 discloses an example of the latent space Z 1000 after the adaptation process. As shown in FIG. 10, the new dataset Tn+1 in this example is T3 1002, which includes data points in class y=0 and class y=1.

D. Example Methods

It is noted with respect to the disclosed methods, including the example methods of FIGS. 1-4, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

E. Further Example Embodiments

Following are some further example embodiments of the invention. These are presented only by way of example and are not intended to limit the scope of the invention in any way.

Embodiment 1. A method, comprising: deploying a malware detection model in a production environment; performing a monitoring process that comprises capturing data from the production environment, by the malware detection model; determining, by the malware detection model, that a likelihood that the data belongs to a domain known to the malware detection model falls below a threshold; determining, by the malware detection model, whether or not the data is noise, or comes from a new domain not known to the malware detection model; and when it is determined that the data comes from the new domain, adapting the malware detection model by incorporating knowledge about the new domain in the malware detection model so that the malware detection model is operable to detect malware in the new domain, as well as the known domain.

Embodiment 2. The method as recited in any preceding embodiment, wherein the knowledge about the new domain is incorporated into the malware detection model without completely retraining the malware detection model.

Embodiment 3. The method as recited in any preceding embodiment, wherein the malware detection model is automatically adapted to detect malware in the new domain.

Embodiment 4. The method as recited in any preceding embodiment, wherein, prior to incorporation of the knowledge about the new domain, the data is unlabeled.

Embodiment 5. The method as recited in embodiment 4, wherein adapting the malware detection model comprises performing a continual learning process.

Embodiment 6. The method as recited in any preceding embodiment, wherein the malware detection model comprises an adaptation of a hybrid continual learning model.

Embodiment 7. The method as recited in any preceding embodiment, wherein the data comprises data points, and determining that the data comes from a new domain comprises: grouping data points that are within a specified distance from each other, and the grouping produces a group of data points; applying a Gaussian mixture model to the group of data points to identify data points below the threshold, and data points above the threshold; sampling the data points above the threshold; applying labels to the sampled data points; and propagating the labels to unlabeled data points that are above the threshold.

Embodiment 8. The method as recited in embodiment 7, wherein the applied labels are determined by an oracle.

Embodiment 9. The method as recited in any preceding embodiment, wherein the malware detection model is deployed in a zero-trust security architecture.

Embodiment 10. The method as recited in any preceding embodiment, wherein after the malware detection model has been adapted, the monitoring process continues with the adapted malware detection model, which replaces the malware detection model as it was configured prior to being adapted.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 11:
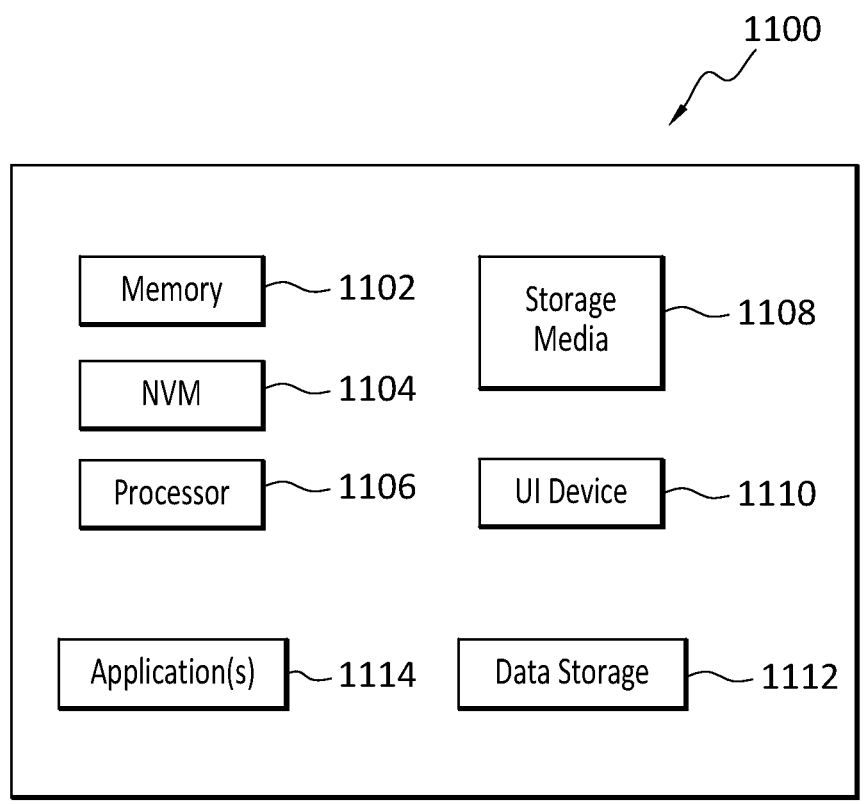
FIG. 11 discloses an example computing entity configured and operable to perform any of the disclosed methods, processes, and operations.

With reference briefly now to FIG. 11, any one or more of the entities disclosed, or implied, by FIGS. 1-10, and/or elsewhere herein, may take the form of, or include, or be implemented on, or hosted by, a physical computing device, one example of which is denoted at 1100. As well, where any of the aforementioned elements comprise or consist of a virtual machine (VM), that VM may constitute a virtualization of any combination of the physical components disclosed in FIG. 11.

In the example of FIG. 11, the physical computing device 1100 includes a memory 1102 which may include one, some, or all, of random access memory (RAM), non-volatile memory (NVM) 1104 such as NVRAM for example, read-only memory (ROM), and persistent memory, one or more hardware processors 1106, non-transitory storage media 1108, UI device 1110, and data storage 1112. One or more of the memory components 1102 of the physical computing device 1100 may take the form of solid state device (SSD) storage. As well, one or more applications 1114 may be provided that comprise instructions executable by one or more hardware processors 1106 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
deploying a malware detection model in a production environment;
performing a monitoring process that comprises capturing data from the production environment, by the malware detection model, and the data comprises data points;
determining, by the malware detection model, that a likelihood that the data belongs to a domain known to the malware detection model falls below a threshold;
determining, by the malware detection model, whether or not the data is noise, or comes from a new domain not known to the malware detection model;
when it is determined that the data comes from the new domain, adapting the malware detection model by incorporating knowledge about the new domain in the malware detection model so that the malware detection model is operable to detect malware in the new domain, as well as the known domain; and determining that the data comes from a new domain comprises:
grouping data points that are within a specified distance from each other, and the grouping produces a group of data points;
applying a Gaussian mixture model to the group of data points to identify data points below the threshold, and data points above the threshold;
sampling the data points above the threshold;
applying labels to the sampled data points; and
propagating the labels to unlabeled data points that are above the threshold.

2. The method as recited in claim 1, wherein the knowledge about the new domain is incorporated into the malware detection model without completely retraining the malware detection model.

3. The method as recited in claim 1, wherein the malware detection model is automatically adapted to detect malware in the new domain.

4. The method as recited in claim 1, wherein, prior to incorporation of the knowledge about the new domain, the data is unlabeled.

5. The method as recited in claim 4, wherein adapting the malware detection model comprises performing a continual learning process.

6. The method as recited in claim 1, wherein the malware detection model comprises an adaptation of a hybrid continual learning model.

7. The method as recited in claim 1, wherein the applied labels are determined by an oracle.

8. The method as recited in claim 1, wherein the malware detection model is deployed in a zero-trust security architecture.

9. The method as recited in claim 1, wherein after the malware detection model has been adapted, the monitoring process continues with the adapted malware detection model, which replaces the malware detection model as it was configured prior to being adapted.

10. A non-transitory storage medium having stored therein instructions that are executable by one or more hardware processors to perform operations comprising:
deploying a malware detection model in a production environment;
performing a monitoring process that comprises capturing data from the production environment, by the malware detection model, and the data comprises data points;
determining, by the malware detection model, that a likelihood that the data belongs to a domain known to the malware detection model falls below a threshold;
determining, by the malware detection model, whether or not the data is noise, or comes from a new domain not known to the malware detection model;
when it is determined that the data comes from the new domain, adapting the malware detection model by incorporating knowledge about the new domain in the malware detection model so that the malware detection model is operable to detect malware in the new domain, as well as the known domain; and
determining that the data comes from a new domain comprises:
grouping data points that are within a specified distance from each other, and the grouping produces a group of data points;
applying a Gaussian mixture model to the group of data points to identify data points below the threshold, and data points above the threshold;
sampling the data points above the threshold;
applying labels to the sampled data points; and
propagating the labels to unlabeled data points that are above the threshold.

11. The non-transitory storage medium as recited in claim 10, wherein the knowledge about the new domain is incorporated into the malware detection model without completely retraining the malware detection model.

12. The non-transitory storage medium as recited in claim 10, wherein the malware detection model is automatically adapted to detect malware in the new domain.

13. The non-transitory storage medium as recited in claim 10, wherein, prior to incorporation of the knowledge about the new domain, the data is unlabeled.

14. The non-transitory storage medium as recited in claim 13, wherein adapting the malware detection model comprises performing a continual learning process.

15. The non-transitory storage medium as recited in claim 10, wherein the malware detection model comprises an adaptation of a hybrid continual learning model.

16. The non-transitory storage medium as recited in claim 10, wherein the applied labels are determined by an oracle.

17. The non-transitory storage medium as recited in claim 10, wherein the malware detection model is deployed in a zero-trust security architecture.

18. The non-transitory storage medium as recited in claim 10, wherein after the malware detection model has been adapted, the monitoring process continues with the adapted malware detection model, which replaces the malware detection model as it was configured prior to being adapted.

* * * * *